(12) United States Patent
Huang et al.

(10) Patent No.: US 9,864,059 B2
(45) Date of Patent: Jan. 9, 2018

(54) ULTRASOUND APPARATUS AND ULTRASOUND METHOD FOR BEAMFORMING WITH A PLANE WAVE TRANSMISSION

(71) Applicant: INDUSTRIAL TECHNOLOGY RESEARCH INSTITUTE, Hsinchu (TW)

(72) Inventors: Chu-Yu Huang, Taichung (TW); Chir-Weei Chang, Taoyuan County (TW); Kuo-Tung Tiao, Zhubei (TW); Wen-Hung Cheng, Bade (TW); Hsin-Yueh Sung, New Taipei (TW); Ren-Jr Chen, Hsinchu (TW); Chung-Lien Ho, Hsinchu (TW); Yi-Ting Wang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 780 days.

(21) Appl. No.: 14/251,299

(22) Filed: Apr. 11, 2014

(65) Prior Publication Data

US 2015/0293222 A1   Oct. 15, 2015

(51) Int. Cl.
*A61B 8/00*   (2006.01)
*G01S 15/89*   (2006.01)

(52) U.S. Cl.
CPC ....... *G01S 15/8977* (2013.01); *G01S 15/8995* (2013.01)

(58) Field of Classification Search
USPC .......................................................... 367/11
See application file for complete search history.

(56) References Cited

U.S. PATENT DOCUMENTS

| | | | |
|---|---|---|---|
| 5,720,708 A | 2/1998 | Lu et al. | |
| 6,551,246 B1 | 4/2003 | Ustuner et al. | |
| 6,685,641 B2 | 2/2004 | Liu | |
| 7,957,609 B2 | 6/2011 | Lu et al. | |
| 8,496,585 B2 | 7/2013 | Lu | |

(Continued)

OTHER PUBLICATIONS

Kruizinga, Pieter, et al. "Plane-wave ultrasound beamforming using a nonuniform fast Fourier transform." IEEE transactions on ultrasonics, ferroelectrics, and frequency control 59.12 (2012).*

(Continued)

*Primary Examiner* — James R Hulka
*Assistant Examiner* — Jonathan D Armstrong
(74) *Attorney, Agent, or Firm* — JCIPRNet

(57) ABSTRACT

According to an exemplary embodiment, an ultrasound apparatus for beamforming with a plane wave transmission may comprise a transceiver connected to a transducer array having at least one transducer element, and at least one processor. The transceiver transmits at least one substantially planar ultrasonic wave into a target region at one or more angles relative to the transducer array, and receives one or more signals responsive from the transducer array. The at least one processor applies a fast Fourier transform (FFT) to the one or more signals from each of the at least one transducer element and calculates at least one frequency within a frequency region, and applies an inverse FFT to at least one produced frequency data.

24 Claims, 15 Drawing Sheets

(56) References Cited

U.S. PATENT DOCUMENTS

| | | | | |
|---|---|---|---|---|
| 8,576,664 | B2* | 11/2013 | Kasano | G01S 15/523 340/554 |
| 2004/0243001 | A1* | 12/2004 | Zagzebski | A61B 8/00 600/437 |
| 2006/0173313 | A1 | 8/2006 | Liu et al. | |
| 2009/0036772 | A1 | 2/2009 | Lu | |
| 2009/0066727 | A1 | 3/2009 | Lu et al. | |
| 2011/0144497 | A1 | 6/2011 | Kim | |
| 2013/0172752 | A1 | 7/2013 | Hu et al. | |
| 2013/0258805 | A1 | 10/2013 | Hansen et al. | |
| 2013/0271757 | A1 | 10/2013 | Kang et al. | |

OTHER PUBLICATIONS

Nilsen, Carl-Inge Colombo, and Sverre Holm. "Wiener beamforming and the coherence factor in ultrasound imaging." IEEE transactions on ultrasonics, ferroelectrics, and frequency control 57.6 (2010): 1329-1346.*

Hollman, K. W., K. W. Rigby, and M. O'Donnell. "Coherence factor of speckle from a multi-row probe." Ultrasonics Symposium, 1999. Proceedings. 1999 IEEE. vol. 2. IEEE, 1999.*

Ledoux, L. A. F. "Propagation of ultrasound in aberrating media: simulations and experiments." 1995. Eindhoven University of Technology Department of Electrical Engineering Medical Electrical Engineering (EME).*

Montaldo et al., Coherent plane-wave compounding for very high frame rate ultrasonography and transient elastography, IEEE Transactions on Ultrasonics, Ferroelectrics, and Frequency Control, Mar. 2009, p. 489-p. 506.

Hu, High frame rate ultrasonic imaging through Fourier Transform using an arbitrary known transmission field, InTech, Apr. 2011, p. 261-p. 281.

Cheng et al., Extended high-frame rate imaging method with limited-diffraction beams, IEEE Trans. on UFFC, vol. 53, No. 5, May 2006, p. 880-p. 899.

Hu et al., Improved plane-wave high frame rate imaging using retrospective transmit focusing and filter-derived coherence-index weighting, 2010 IEEE International Ultrasonics Symposium Proceedings, Oct. 2012, p. 1916-p. 1919.

Holfort, Planewave Medical Ultrasound Imaging Using Adaptive Beamforming, Sensor Array and Multichannel Signal Processing Workshop, 2008. SAM 2008. 5th IEEE, Jul. 2008, p. 288-p. 292.

* cited by examiner

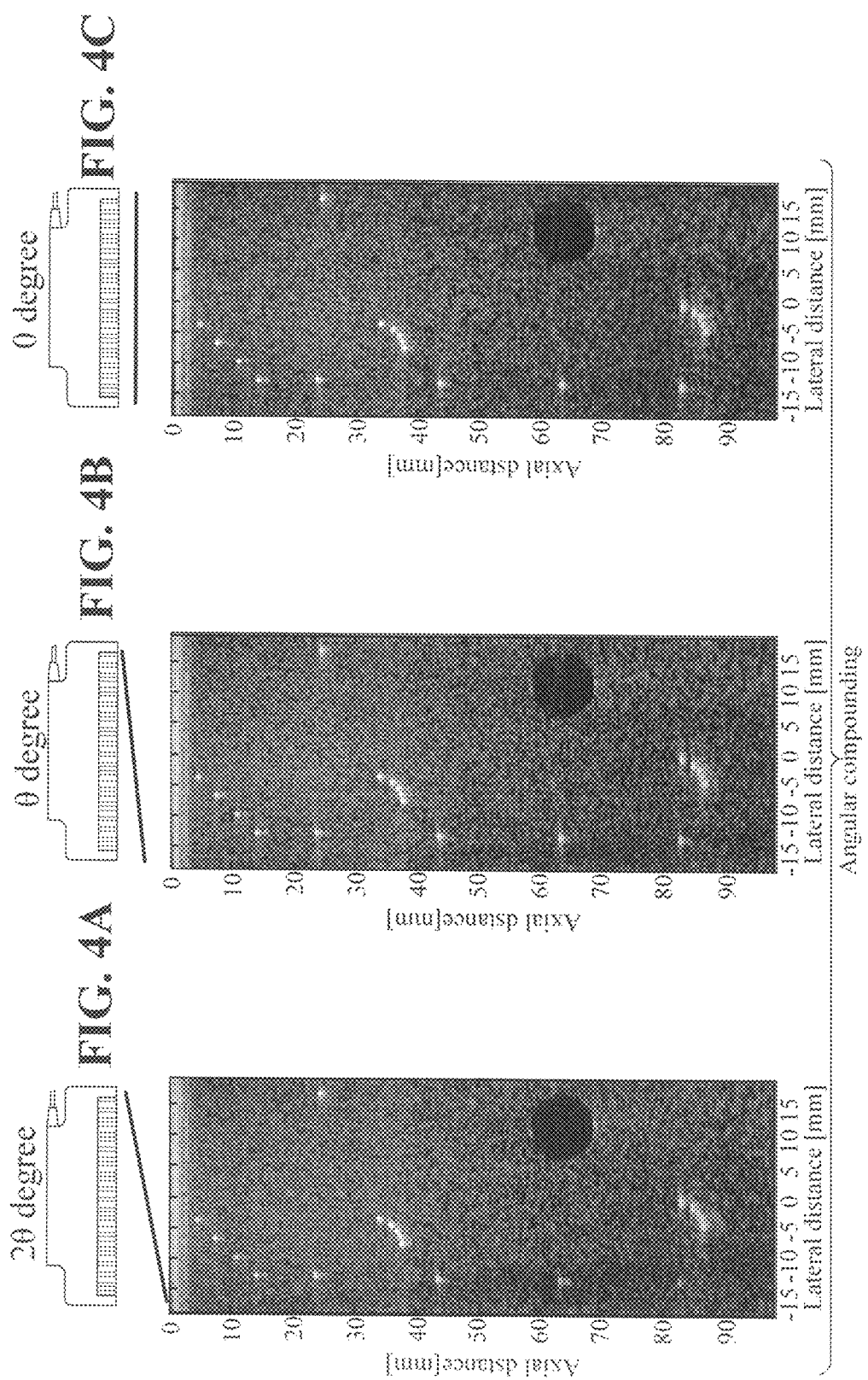

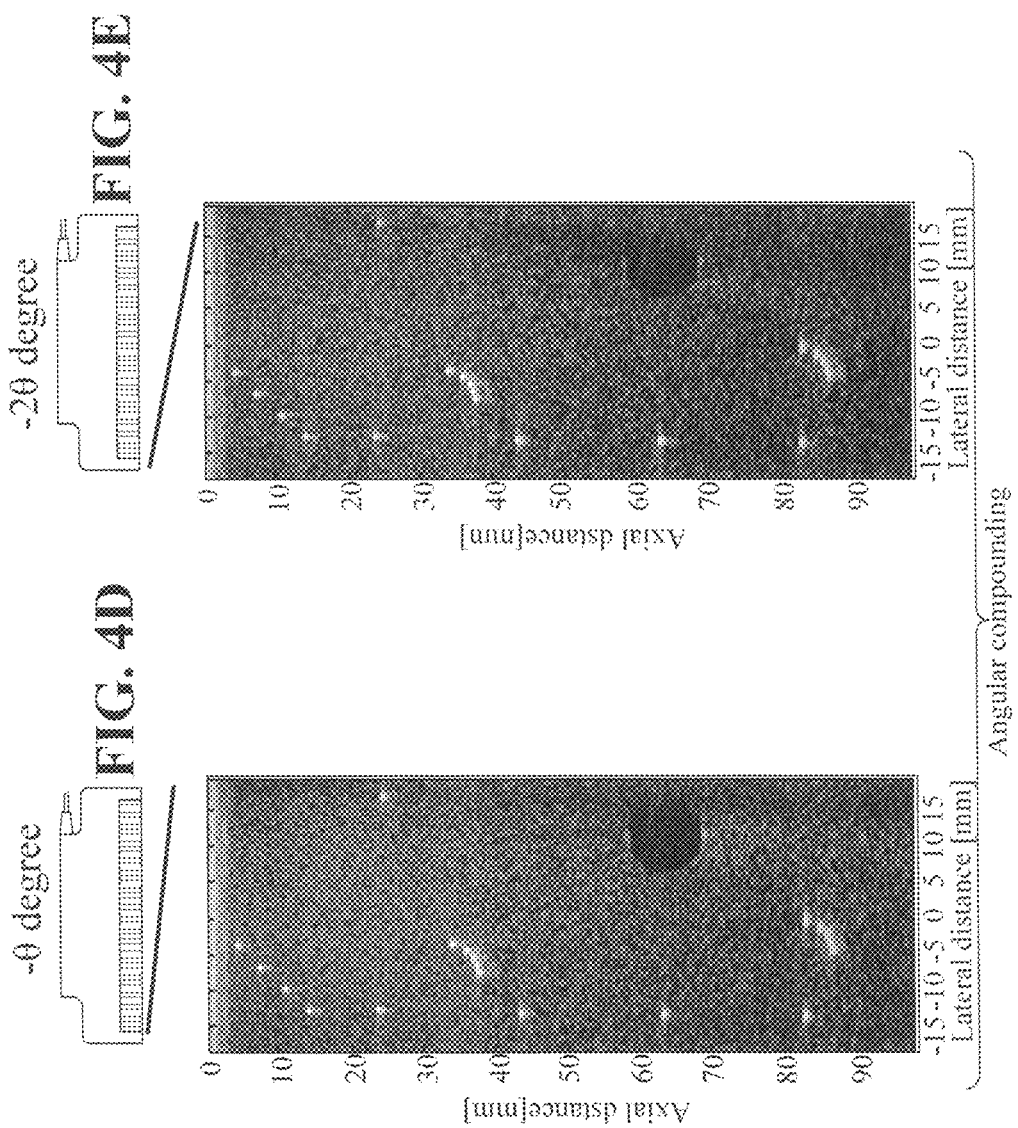

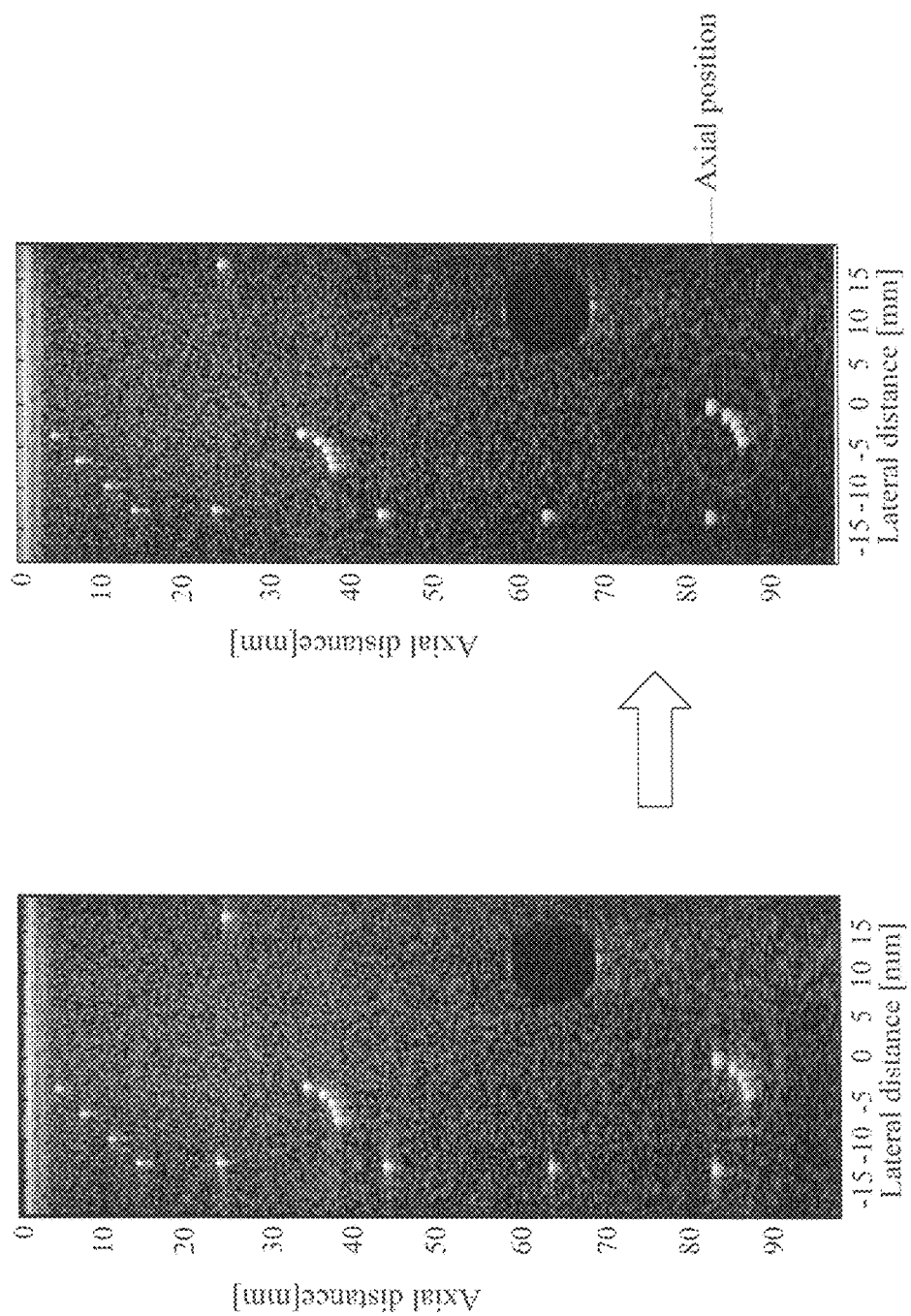

ULTRASOUND APPARATUS AND ULTRASOUND METHOD FOR BEAMFORMING WITH A PLANE WAVE TRANSMISSION

TECHNICAL FIELD

The disclosure generally relates to an ultrasound apparatus and an ultrasound method for beamforming with a plane wave transmission.

BACKGROUND

One of ultrasound imaging techniques may employ line scan imaging together with focused wave in more than one transmission. This technique may emit more than one wave in different directions and depths to a transducer having a plurality of active transducer elements for performing wave focusing, and may use one scan line for each transmit event. This allows a constructed image may have an enhanced image resolution. This may reduce frame rate such as 20~30 frames per second. Multiple Line Acquisition (MLA) technique may use more than one scan lines for each transmit event. This allows for fewer transmit events with the same amount of scan lines. This MLA technique may have a reduced image resolution of a constructed image, increased hardware needs and so on.

High frame rate imaging techniques have been used in some applications such as medical ultrasonic imaging systems. For example, a frame rate of at least 1000 framed per second may be used for ultrasound elastography applications. High frame rate imaging theorem uses a pulsed plane wave in transmission and limited-diffraction array beam weightings are applied to the received signals for producing a spatial Fourier transform of an object function for three-dimensional image reconstruction. A technique for extended high frame rate imaging with limited-diffraction beams may further use an inverse fast Fourier transform to reconstruct a two- or three-dimensional image data set from a group of transmitted signals weighted by the single spatial frequency or time delay, and the dynamically received signals weighted with multiple spatial frequencies or processed by a spatial Fourier transform; and may reconstruct a high frame rate and a high contrast image from the image data set.

Ultrasound imaging technique plays an important role in producing multi-dimensional images. Therefore, there is a need in the art for ultrasound imaging that may be made and operated at high qualities such as at a high frame rate, a high spatial and contrast image resolution, with less computation complexity and so on, and may cover an entire imaging region per transmit event.

SUMMARY

The exemplary embodiments of the present disclosure may provide an ultrasound apparatus and an ultrasound method for beamforming with a plane wave transmission.

One exemplary embodiment relates to an ultrasound apparatus for beamforming with a plane wave transmission. The ultrasound apparatus may comprise a transceiver connected to a transducer array having at least one transducer element, and at least one processor. The transceiver transmits at least one substantially planar ultrasonic wave into a target region at one or more angles relative to the transducer array, and receives one or more signals responsive from the transducer array. The at least one processor applies a fast Fourier transform (FFT) to the one or more signals from each of the at least one transducer element and calculates at least one frequency within a frequency region, and applies an inverse FFT to at least one produced frequency data.

Another exemplary embodiment relates to an ultrasound method for beamforming with a plane wave transmission. The ultrasound method may comprise: transmitting, by a transceiver, at least one substantially planar ultrasonic wave into a target region at one or more angles relative to a transducer array having at least one transducer element, and receiving one or more signals responsive from the transducer array; and performing a beamforming by at least one processor, which further including: applying a fast Fourier transform (FFT) to the one or more signals from each of the at least one transducer element and calculating at least one frequency within a frequency region, and applying an inverse FFT to at least one produced frequency data.

Yet another exemplary embodiment relates to an ultrasound method for beamforming with a plane wave transmission. The ultrasound method may comprise: for each angle of a plurality of different angles, transmitting by a transceiver, a corresponding substantially planar ultrasonic wave into a target region at the angle relative to a transducer array having at least one transducer element, and receiving one or more corresponding signals responsive from the transducer array; and applying by using at least one processor, a fast Fourier transform (FFT) to the one or more corresponding signals from each of the at least one transducer element and calculating at least one corresponding frequency data within a frequency region for each of the plurality of different angles, then computing a combined frequency data by using a plurality of produced frequency data and applying an inverse FFT to the combined frequency data.

Yet another exemplary embodiment relates to an ultrasound method for beamforming with a plane wave transmission. The ultrasound method may comprise: for each angle of a plurality of different angles, transmitting by a transceiver, a corresponding substantially planar ultrasonic wave into a target region at the angle relative to a transducer array having at least one transducer element, and receiving one or more corresponding signals responsive from the transducer array; and applying by using at least one processor, a fast Fourier transform (FFT) to the one or more corresponding signals from each of the at least one transducer element, calculating at least one frequency data within a frequency region and applying an inverse FFT to each of the plurality of frequency data for each of the plurality of different angles, thereby obtaining a plurality of corresponding beamformed images, and computing a final beamformed image that is a function of the plurality of corresponding beamformed images and a coherence factor.

The foregoing and other features of the exemplary embodiments will become better understood from a careful reading of detailed description provided herein below with an appropriate reference to the accompanying drawings.

BRIEF DESCRIPTION OF THE DRAWINGS

FIG. 4A~FIG. 4E show schematic views illustrating an angular compounding scheme, according to an exemplary embodiment.

FIG. 7A and FIG. 7B shows an exemplary experimental result of a single plane wave image and an exemplary experimental result of a multi-plane wave compounded image, respectively, according to exemplary embodiments.

DETAILED DESCRIPTION OF THE EXEMPLARY EMBODIMENTS

Figure 1A:
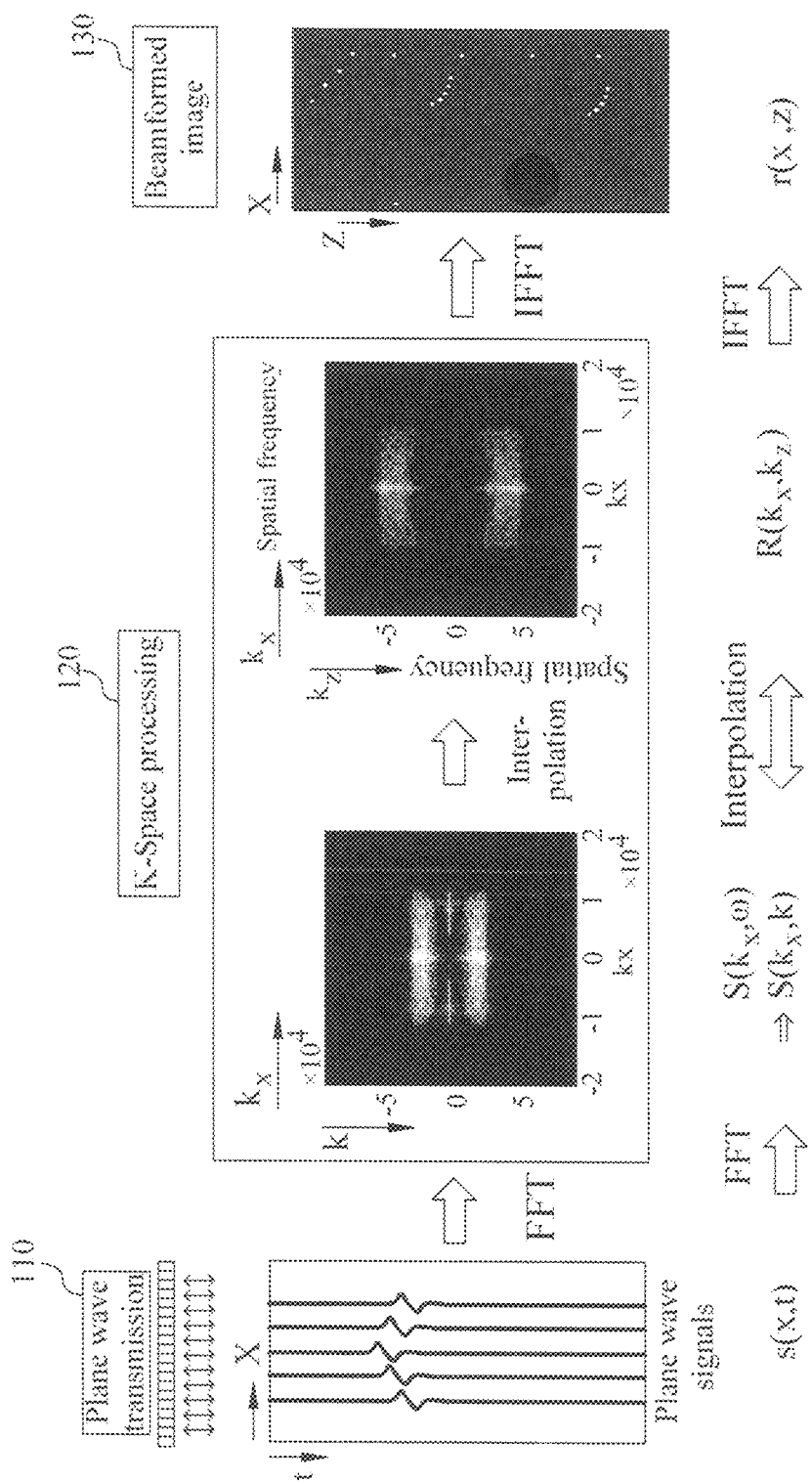
FIG. 1A and FIG. 1B show an exemplary schematic view illustrating a possible scenario of an ultrasound technique, according to an exemplary embodiment.

Below, exemplary embodiments will be described in detail with reference to accompanied drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like transducer elements throughout.

Figure 1B:
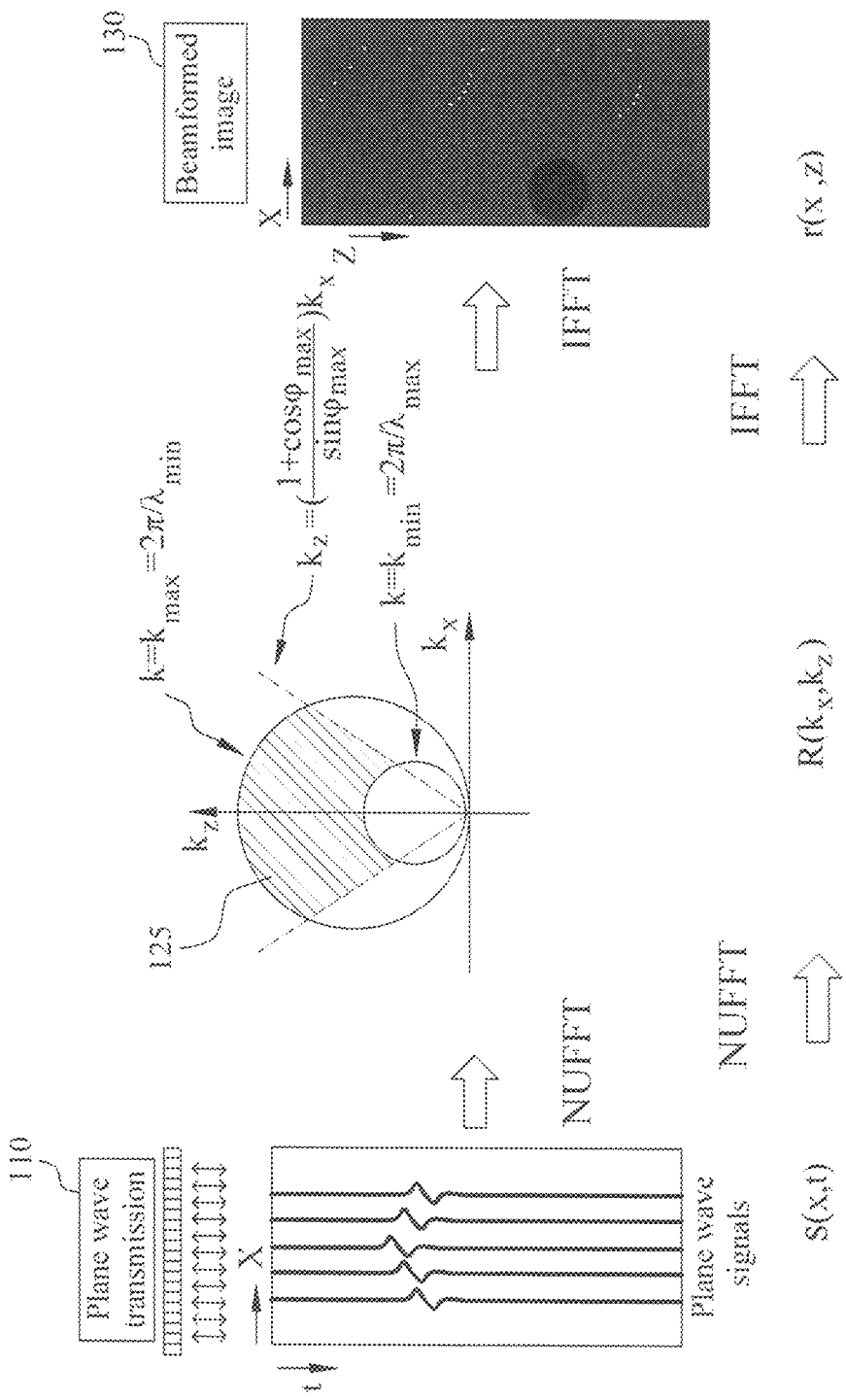

The disclosed exemplary embodiments may provide an ultrasound technique. One of possible scenarios is depicted in FIG. 1A and FIG. 1B, wherein a transmitter end uses plane waves for transmission, while a backend cooperates with an imaging technique using K-Space (spatial frequency domain) beamforming. Referring to FIG. 1A, this scenario involves a plane wave transmission 110 at the transmitting end, and a K-Space processing 120 at the backend. A FFT is performed before the K-Space processing 120 and an inverse FFT is performed after the K-Space processing 120, thereby forming a beamformed image 130, i.e. an image of an object to be tested. In the plane wave transmission 110, for the object to be tested, it may transmit a plane wave such as a planar or mildly focused ultrasonic wave into a region at an angle θ relative to a transducer array such as a probe head, and receive simultaneously each of plane wave signals s(x,t) from one or more channel(s), wherein θ is a plane wave steered angle between a traveling direction of the planar or mildly focused ultrasonic wave and a normal line perpendicular to a surface of a probe head, s(x,t) represents a plane wave signal received such as by the probe head, at time t, and x represents the lateral position of a transducer element of the transducer array used to receive a signal.

A K-Space beamforming may include applying a FFT, K-Space processing 120, and applying an inverse FFT. And the K-Space beamforming may be performed as follows. Referring to FIG. 1B, the plane wave signal s(x,t) is transformed, by applying a fast Fourier transform (FFT) such as a non-uniform FFT (NUFFT), from a time domain to a spatial frequency domain, thereby obtaining a spatial frequency spectrum $R(k_x, k_z)$ within a frequency region 125, as shown in a slash region of the FIG. 1B. Wherein $(k_x, k)$ is a coordinate in a spatial frequency domain before the NUFFT, $(k_x, k_z)$ is a coordinate in a spatial frequency domain after the NUFFT, $k_x=2\pi/\text{pitch}$, $k_z=2\pi/dz$, pitch is a distance between two different transducer elements (for example, the distance between a first center of a first transducer element and a second center of a second transducer element) on the probe head, $k=\omega/c=2\pi f/c$, wherein c is the speed of ultrasound, f is the frequency of the ultrasound, and $\omega=2\pi f$, and is the angular frequency. According to the exemplary embodiments of the present disclosure, there is no need to perform an interpolation once the NUFF is applied.

In the frequency region 125, k satisfies the following conditions:

$$k > 2\pi/\lambda_{max},$$

$$k < 2\pi/\lambda_{min},$$

$$k_z > \left(\frac{1+\cos\varphi_{max}}{\sin\varphi_{max}}\right)k_x,$$

$$k_z > (-1)\left(\frac{1+\cos\varphi_{max}}{\sin\varphi_{max}}\right)k_x,$$

and $\varphi_{max}$ is the maximum acceptance angle of transducer elements of the transducer array. The relation among k, $k_z$ and $k_x$ may be expressed as follows.

$$k = \frac{k_z^2 + k_x^2}{2k_z\cos\theta + 2k_x\sin\theta}.$$

Then, the image at a position (x,z) of the object to be tested r(x,z) may be obtained by applying an inverse fast Fourier transform (IFFT) to the spatial frequency spectrum $R(k_x, k_y)$, as shown in FIG. 1B.

Figure 2:
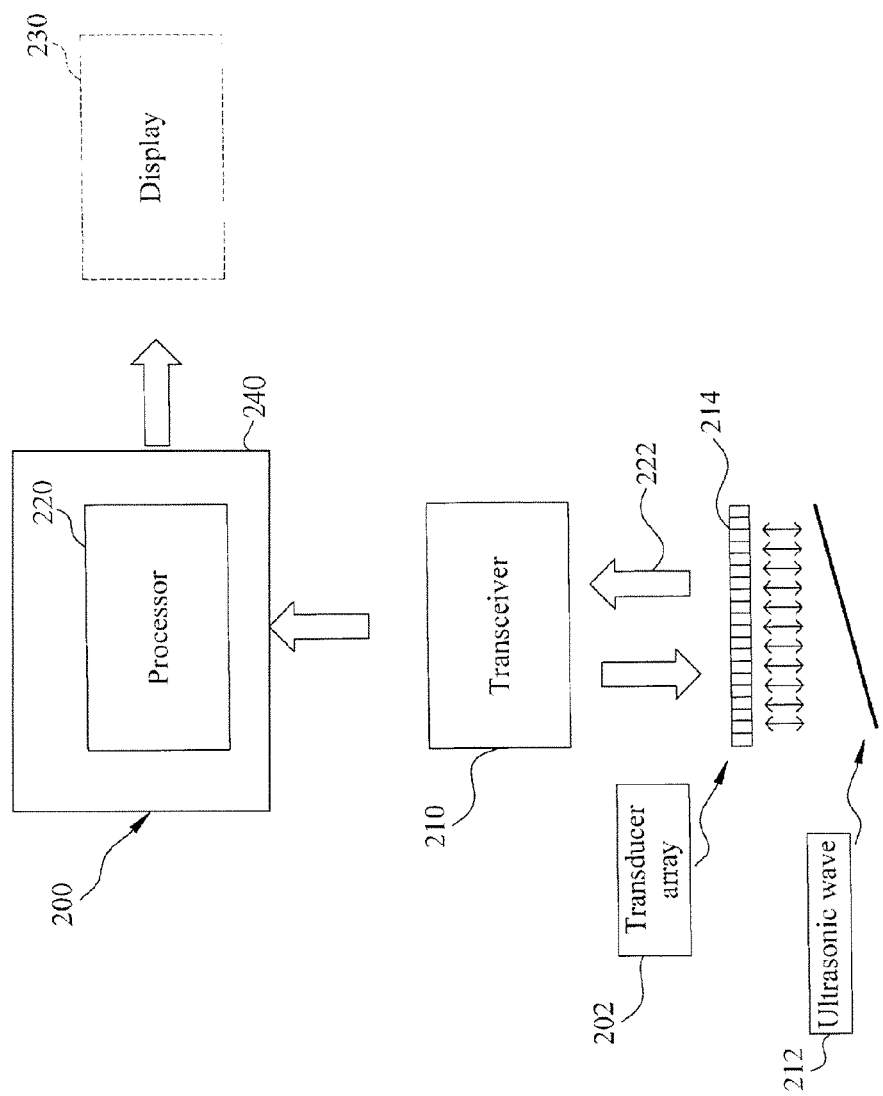
FIG. 2 shows an ultrasound apparatus for beamforming with a plane wave transmission, according to an exemplary embodiment.

Accordingly, FIG. 2 shows an ultrasound apparatus for beamforming with a plane wave transmission, according to an exemplary embodiment. Referring to FIG. 2, an ultrasound apparatus 200 may comprise a transceiver 210 connected to a transducer array 202 having at least one transducer element 214, and at least one processor 220. The transceiver 210 may transmit a substantially planar ultrasonic wave 212 into a target region at an angle relative to the transducer array 202, and receive one or more signals 222 responsive from the transducer array 202. The at least one processor 220 may apply a fast Fourier transform to the one or more signals from each of the at least one transducer element 214 and calculate at least one frequency within a frequency region, and apply an inverse fast Fourier transform to at least one produced frequency data.

According to the exemplary embodiments, the at least oneprocessor 220 may be, but not limited to a K-Space processor. The at least one processor 220 may be in a receiver end 240 to perform the K-Space beamforming. Transceiver 210 may further include at least one transmitter and at least one receiver. The at least one transmitter may transmit the substantially planar ultrasonic wave 212 into the target region to the transducer array 202. The target region is a region for at least one target, and the target may be, but not limited to a human body, an object, and so on. The at least one receiver may receive the one or more signals 222 responsive from the transducer array 202. The ultrasound apparatus 200 may further include the transducer array 202. The ultrasound apparatus 200 may use a display 230 to display one or more results produced by the at least one processor 220, such as a beamformed image after the inverse fast Fourier transform has been applied to the at least one produced frequency data such as spatial frequency spectrum. The at least one processor 220 may apply a non-uniform fast Fourier transform to the one or more signals from each of the at least one transducer element 214.

With the ultrasound apparatus in FIG. 2, an exemplary experiment may be conducted as follows. A transducer array such as an ultrasound probe having such as 128 transducer elements is employed to perform a single plane wave transmission with a steered angle θ, wherein θ equals to 0°, and a processor is used to perform K-spacing beamforming, thereby producing a beamformed image at the backend.

Figure 3A:
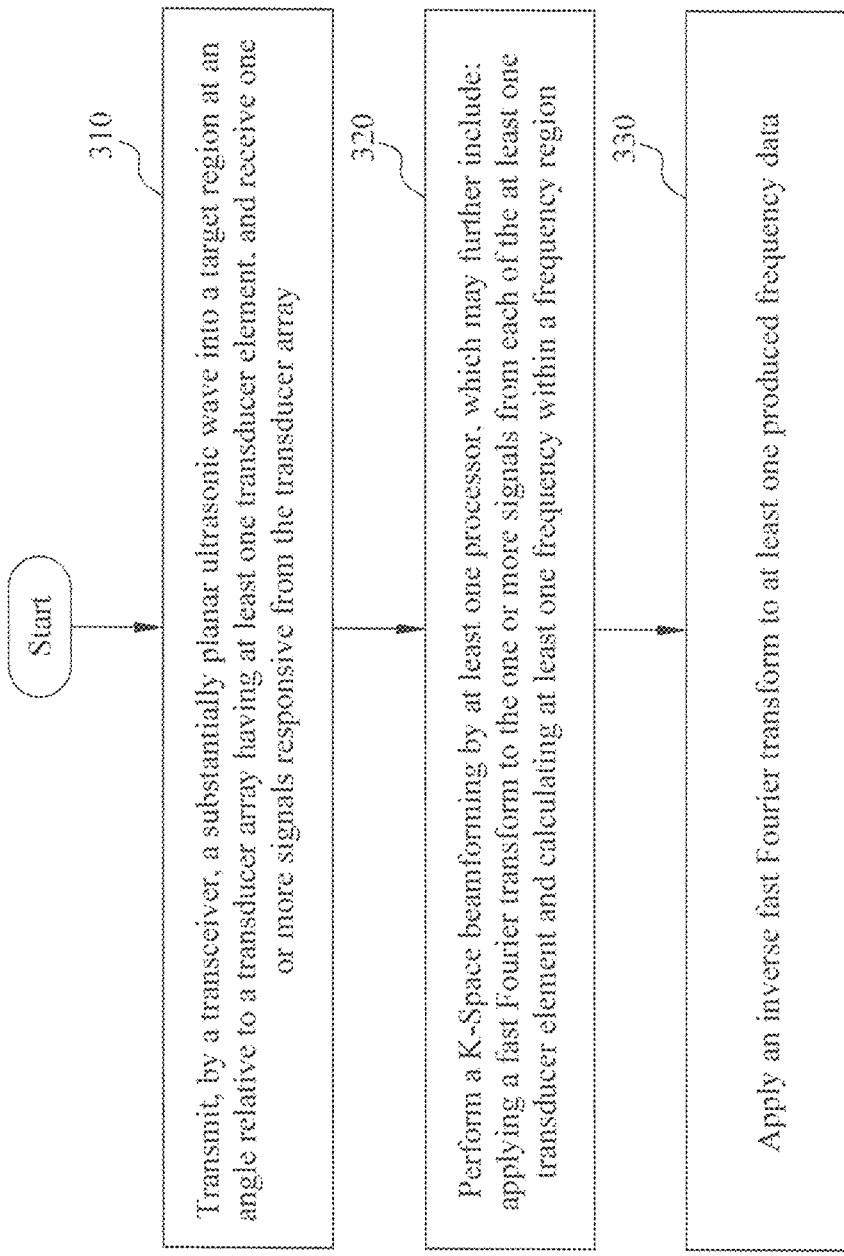
FIG. 3A shows an ultrasound method for beamforming with a plane wave transmission, according to an exemplary embodiment.

Accordingly, FIG. 3A shows an ultrasound method for beamforming with a plane wave transmission, according to an exemplary embodiment. Referring to FIG. 3A, the ultrasound method may transmit, by a transceiver, a substantially planar ultrasonic wave into a target region at an angle relative to a transducer array having at least one transducer element, and receive one or more signals (may be referred to as plane wave signals) responsive from the transducer array (step 310), and perform a K-Space beamforming by at least one processor, which may further include: applying a fast Fourier transform to the one or more signals from each of the at least one transducer element and calculating at least one frequency within a frequency region (step 320), and applying an inverse fast Fourier transform to at least one produced frequency data (step 330).

Figure 3B:
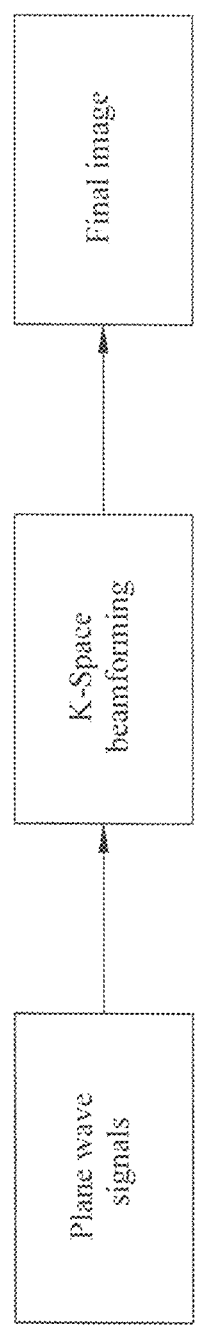
FIG. 3B shows a schematic view illustrating an operation flow to form an ultrasound image by using the K-Space beamforming, according to an exemplary embodiment.

In other words, the operation flow to form an ultrasound image by using the K-Space beamforming may include three parts shown in FIG. 3B, i.e. using plane wave signals as input, performing K-Space beamforming, and producing a final image, for example, the beamformed image of an object to be tested. Wherein, performing the K-Space beamforming may include steps 320 and 330. While for an object to be tested, the plane wave signals may be obtained by following the step 310.

When the ultrasound apparatus in FIG. 2 further applies an angular compounding scheme at the receiver end, the image resolution of the beamformed image may be increased. FIG. 4A~FIG. 4E shows schematic views illustrating the angular compounding scheme, according to an exemplary embodiment. Referring to FIG. 4A~FIG. 4E, for each incident angle $\theta_i$, $1 \leq i \leq 5$, K-Space beamforming is performed by using steered plane wave signals at the incident angle $\theta_i$, wherein $\theta_1 = 2\theta$ degree, $\theta_2 = \theta$ degree, $\theta_3 = 0$ degree, $\theta_4 = -\theta$ degree, and $\theta_5 = -2\theta$ degree, and each $\theta_i$ is a steered angle between a traveling direction of the wave and a normal line perpendicular to a surface of a transducer array having a plurality of transducer elements. After all K-Space beamforming has been completed at the five different incident angles, angular compounding will be further applied on five produced results.

Figure 5:
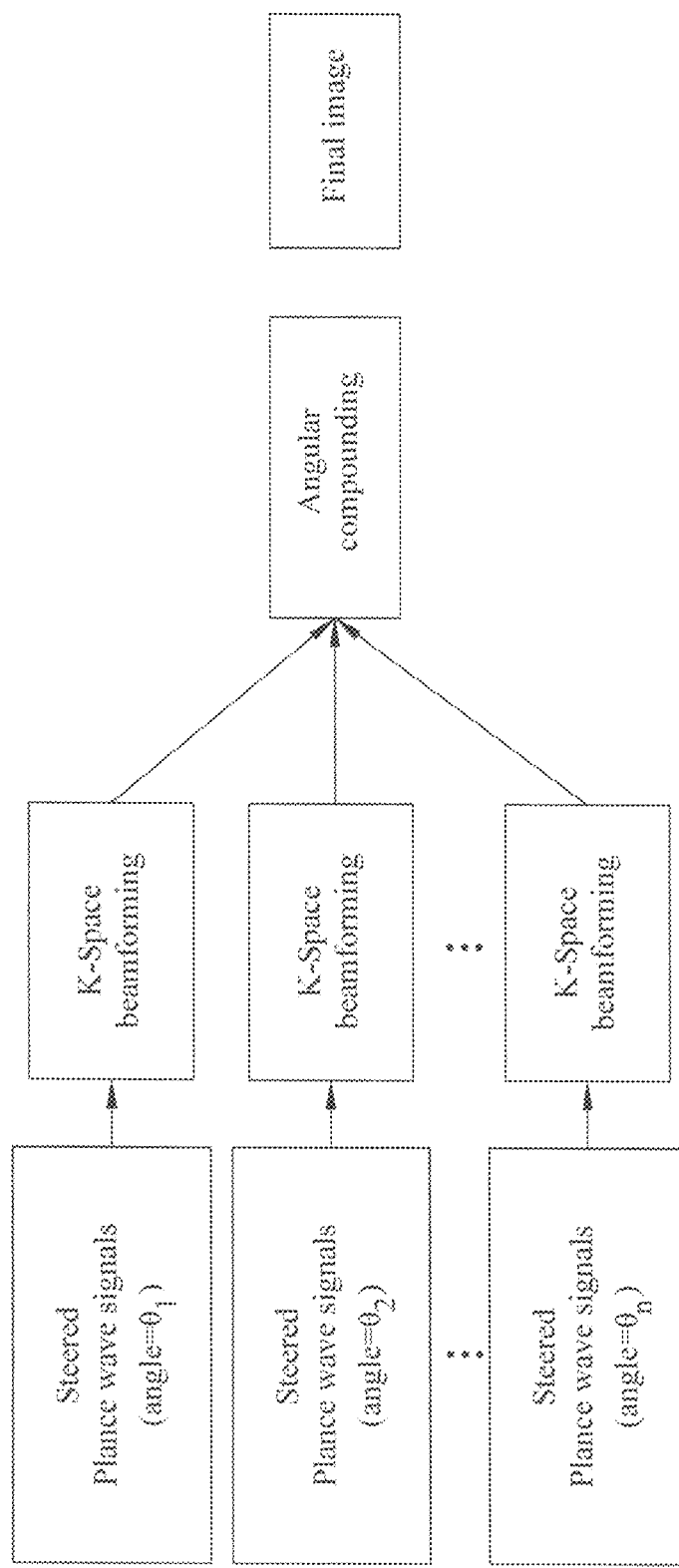
FIG. 5 shows a schematic view illustrating an operation flow when the ultrasound apparatus in FIG. 2 further applies an angular compounding scheme, according to an exemplary embodiment.

FIG. 5 shows a schematic view illustrating an operation flow when the ultrasound apparatus in FIG. 2 further applies an angular compounding scheme at the receiver end, according to an exemplary embodiment. Referring to FIG. 5, in the operation flow, K-Space beamforming is repeatedly performed by using steered plane wave signals at different incident angles (such as $\theta_1, \theta_2, \ldots, \theta_n$) as input, and an angular compounding scheme is further applied on the n results produced by performing said each K-Space beamforming, thereby producing a final image at the receiver end.

With the operation flow in FIG. 5, an exemplary experiment may be conducted as follows. A transducer array such as an ultrasound probe having 128 transducer elements is employed to perform plane wave transmissions with varied steered angles such as 5 different steered angles. For example, the 5 different steered angles may be −6°, −3°, 0°, 3°, and 6°. A processor is used to perform K-Spacing beamforming with angular compounding by using the steered plane wave signals at the five different incident angles as input, thereby producing a beamformed image, i.e. a multi-plane wave compounded image of an object to be tested, at the received end.

Figure 6:
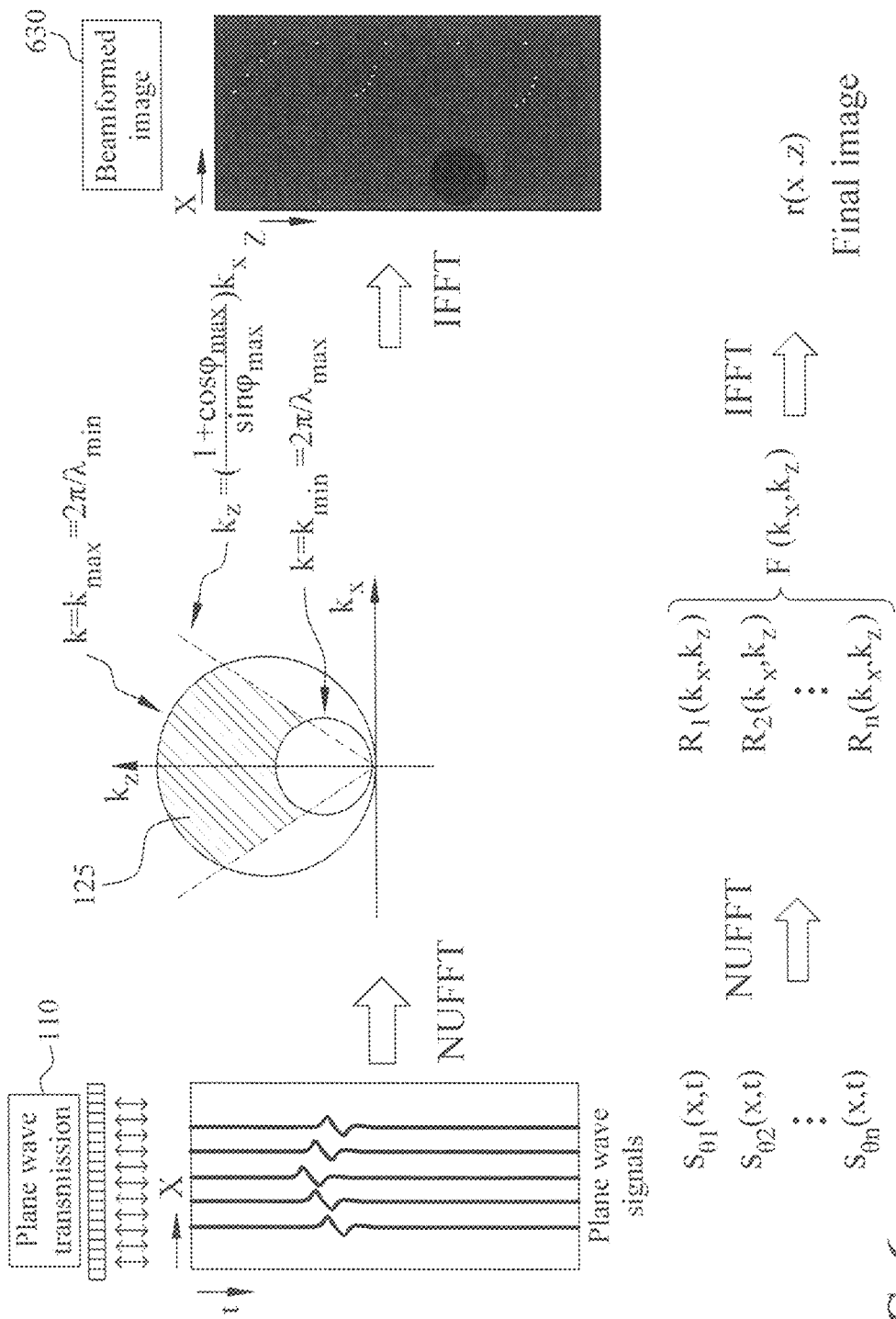
FIG. 6 shows an exemplary implementation of the operation flow in FIG. 4, according to exemplary embodiments.

In other words, the operation according to the flow in FIG. 5 may be implemented as shown in FIG. 6. Referring to FIG. 6 in the plane wave transmission, for the object to be tested, it may repeatedly transmit a substantially planar ultrasonic wave such as a planar or mildly focused ultrasonic wave into a target region at an angle $\theta_j$ relative to such as a transducer array, and receive simultaneously plane wave signals $s_{\theta_j}(x,t)$ from one or more channel(s), wherein $2 \leq j \leq n$. For each j, a fast Fourier transform is applied on the plane wave signals $s_{\theta_j}(x,t)$ to transform the plane wave signals $s_{\theta_j}(x,t)$ from a time domain into a spatial frequency domain, thereby producing spatial frequency spectrum $R_j(k_x, k_z)$. In the angular compounding, a combined spatial frequency spectrum $F(k_x, k_z)$ is calculated with these produced spatial frequency spectrum $R_j(k_x, k_z)$, i.e. the combined spatial frequency spectrum is a function of $R_1(k_x, k_z), R_2(k_x, k_z), \ldots, R_n(k_x, k_z)$. For example, $F(k_x, k_z)$ may be an average or sum of $R_1(k_x, k_z), R_2(k_x, k_z), \ldots, R_n(k_x, k_z)$. Finally, a beamformed image 630 may be obtained by applying an inverse FFT on the combined spatial frequency spectrum $F(k_x, k_z)$.

Therefore, in accordance with another exemplary embodiment, an ultrasound method for beamforming with a plane wave transmission may comprise: for each angle of a plurality of different angles, transmitting by a transceiver, a corresponding substantially planar ultrasonic wave into a target region at the angle relative to a transducer array having at least one transducer element, and receiving one or more corresponding signals responsive from the transducer array; and applying by using at least one processor, a fast Fourier transform (FFT) to the one or more corresponding signals from each of the at least one transducer element and calculating at least one corresponding frequency data within a frequency region for each of the plurality of different angles, then computing a combined frequency data by using a plurality of calculated frequency data and applying an inverse FFT to the combined frequency data.

FIG. 7A and FIG. 7B show an exemplary single plane wave image and an exemplary multi-plane wave compounded image at an axial position, respectively, according to exemplary embodiments. The single plane wave image of FIG. 7A is produced in accordance with the ultrasound method shown in FIG. 3, while the multi-plane waves (for example, 5 plane waves) compounded image of FIG. 7B is produced in accordance with the operation flow shown in FIG. 5.

Figure 8A:
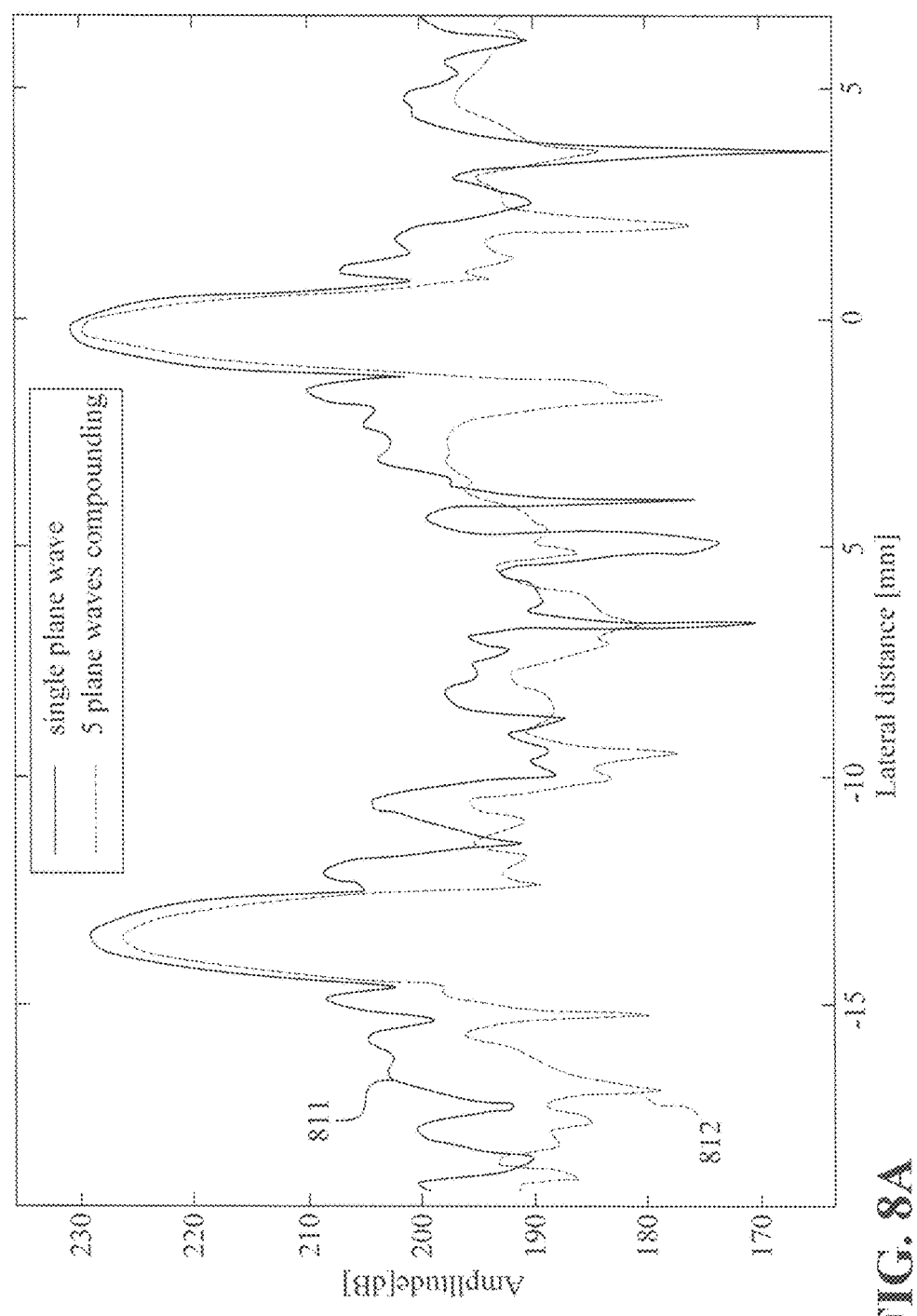
FIG. 8A shows intensity profiles of the single plane wave image of FIG. 7A versus the angular compounded image of FIG. 7B at an axial position, according to the exemplary embodiments.
Figure 8B:
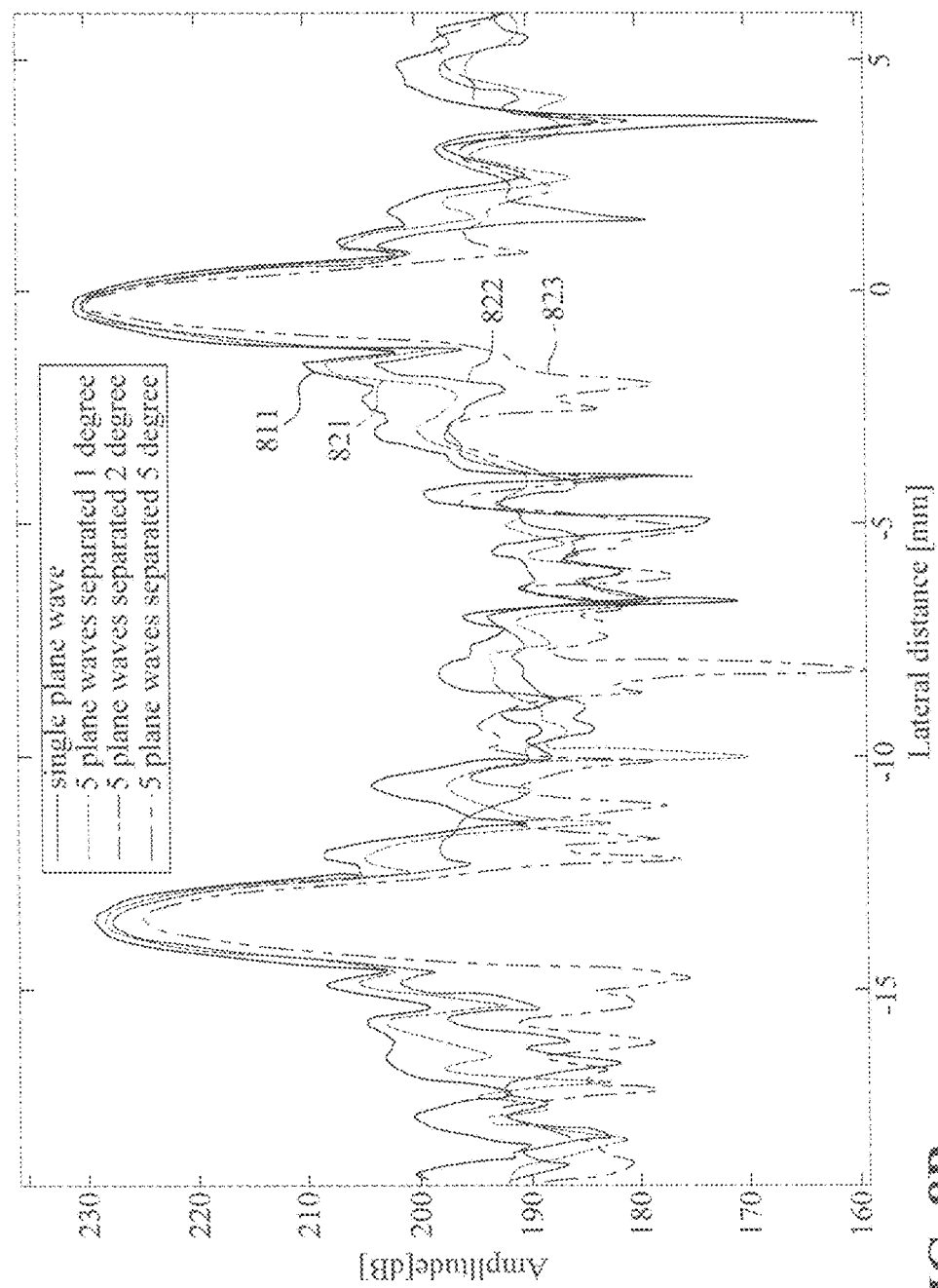
FIG. 8B shows intensity profiles of 5 plane waves compounding separated by varied degrees, according to an exemplary embodiment.

FIG. 8A further shows intensity profiles of the single plane wave image of FIG. 7A versus the angular compounded image of FIG. 7B at an axial position, according to the exemplary embodiments, wherein the horizontal axis represents lateral distance (in a unit of mm) and the vertical axis represents amplitude (in a unit of dB). In FIG. 8A, a curve 811 indicates the intensity profile of the single plane wave image, while a curve 812 indicates the intensity profile of the angular compounded image. FIG. 8B further shows intensity profiles of 5 plane waves compounding separated by varied degrees, according to an exemplary embodiment, wherein the horizontal axis represents lateral distance (in a unit of mm) and the vertical axis represents amplitude (in a unit of dB). In FIG. 8B, curves 821~823 indicates the intensity profiles of 5 plane waves images compounding separated by 1 degree, 2-degree and 5-degree, respectively.

From FIG. 7A, FIG. 7B, FIG. 8A and FIG. 8B, it may be seen that when the ultrasound apparatus in FIG. 2 further applies an angular compounding scheme at the receiver end, the image resolution of the beamformed image may be increased.

Figure 9:
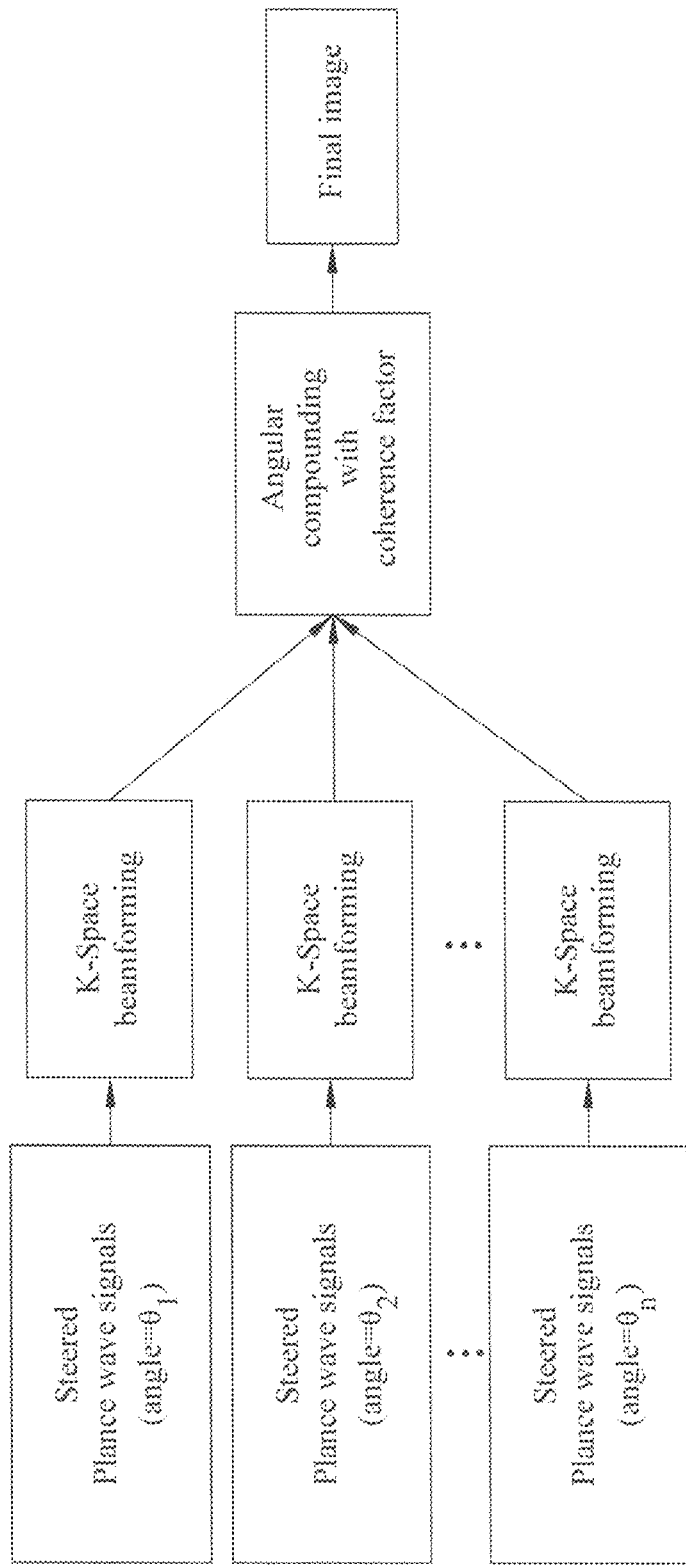
FIG. 9 shows a schematic view illustration an operation flow when the ultrasound apparatus in FIG. 2 further applies an angular compounding scheme with a coherence factor at the receiver end, according to an exemplary embodiment.

As exemplary embodiments, for those images from mainlobe components, they may look similar to each other, while for those images from sidelobe components, they may appear different from each other. Therefore, when the ultrasound apparatus in FIG. 2 further applies an angular compounding scheme with a coherence factor at the receiver end, the spatial and contrast resolution of the beamformed image may be further increased. FIG. 9 shows a schematic view illustration an operation flow when the ultrasound apparatus in FIG. 2 further applies an angular compounding scheme with a coherence factor at the receiver end, according to an exemplary embodiment. Instead of calculating a combined $F(k_x, k_z)$ as in FIG. 5, the operation flow in FIG. 9 further involves a coherence factor in the angular compounding, which may be implemented as follows. First, each obtained spatial frequency spectrum $R_j(k_x, k_z)$, $2 \leq j \leq n$, is directly applied an inverse FFT, and a corresponding beamformed image $r_j$ will be obtained. With these images $r_j$, $2 \leq j \leq n$, a compounded final image $r_f(x,z)$ is obtained by a formula $r_f(x,z) = C_{xz} * F(r_1, r_2, \ldots, r_n)$, and $C_{xz}$ is a coherence factor at a position (x,z). The coherence factor $C_{xz}$ may be defined as, but not limited to $$C_{xz} = \frac{\left|\sum_{i=1}^{n} r_i(x, z)\right|^2}{n \sum_{i=1}^{n} |r_i(x, z)|^2},$$

F is a function of $r_1, r_2, \ldots, r_n$, and n is a number of images used in the compounding. In other words, the coherence factor may be determined by a number of images used in an angular compounding and the plurality of corresponding beamformed images, according to one exemplary experiment.

With the operation flow in FIG. 9, an exemplary experiment may be conducted as follows. A transducer array such as an ultrasound probe having 128 transducer elements is employed to perform plane wave transmissions with varied steered angles such as 5 different steered angles. For example, the 5 different steered angles may be −6°, −3°, 0°, 3°, and 6°. At least one processor may be employed to perform K-spacing beamforming and angular compounding with a coherence factor by using the steered plane wave signals at the five different incident angles as input, thereby producing a beamformed image at the received end.

Therefore, yet in accordance with another exemplary embodiment, an ultrasound method for beamforming with a plane wave transmission may comprise: for each of a plurality of different angles, transmitting by a transceiver, a corresponding substantially planar ultrasonic wave into a target region at the angle relative to a transducer array having at least one transducer element, and receiving one or more corresponding signals responsive from the transducer array; and applying by using at least one processor, a fast Fourier transform (FFT) to the one or more corresponding signals from each of the at least one transducer element, calculating at least one frequency data within a frequency region and applying an inverse FFT to each of the plurality of frequency data for each of the plurality of different angles, thereby obtaining a plurality of corresponding beamformed images, and computing a final beamformed image that is a function of the plurality of corresponding beamformed images and a coherence factor.

Figure 10B:
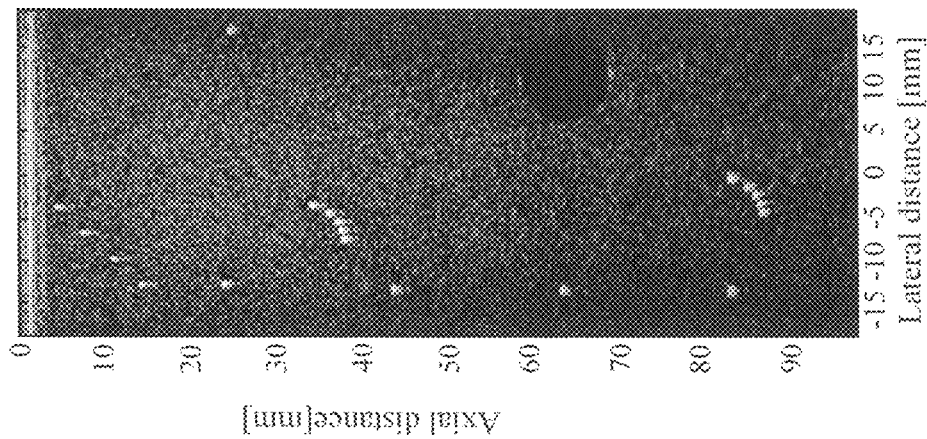
FIG. 10A and FIG. 10B show an exemplary single plane wave image and an exemplary multi-plane wave compounded image and an exemplary multi-plane wave compounded image with a coherence factor, respectively, according to exemplary embodiments.
Figure 10A:
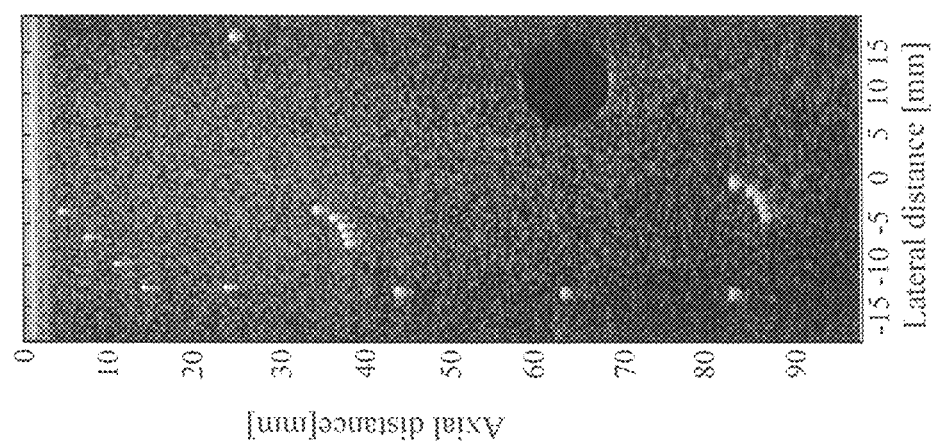
Figure 11:
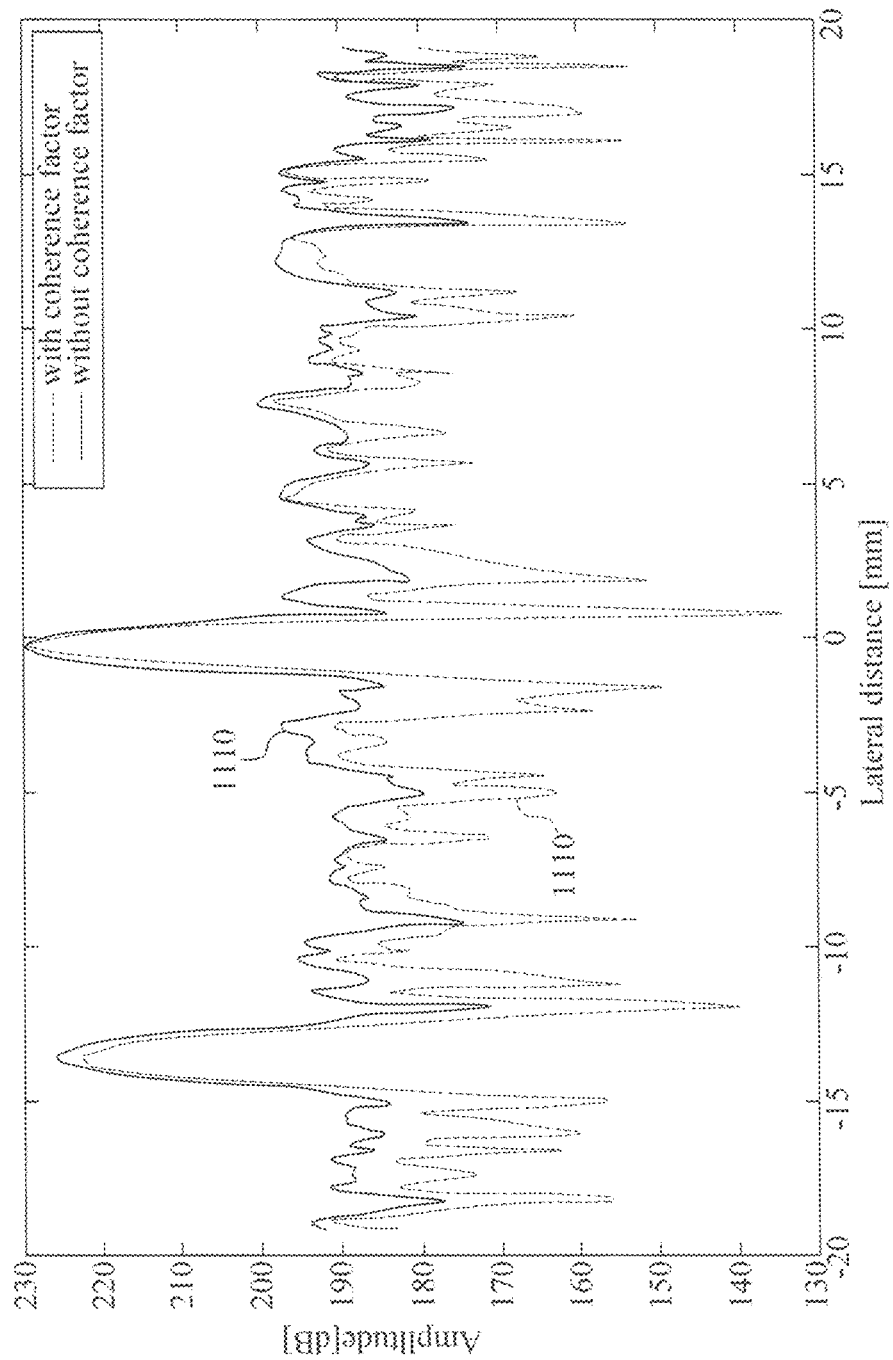
FIG. 11 shows intensity profiles of multi-plane waves angular compounding without a coherence factor vs with a coherence factor, according to an exemplary embodiment.

FIG. 10A and FIG. 10B show an exemplary multi-plane wave compounded image and an exemplary multi-plane wave compounded image with a coherence factor, respectively, according to exemplary embodiments. FIG. 11 shows intensity profiles of an exemplary multi-plane wave compounded image without a coherence factor vs with a coherence factor, according to an exemplary embodiment, wherein the horizontal axis represents lateral distance (in a unit of mm) and the vertical axis represents amplitude (in a unit of dB). In FIG. 11, a curve 1110 indicates the intensity profiles of an exemplary multi-plane wave compounded image without a coherence factor, while a curve 1120 indicates the intensity profiles of an exemplary multi-plane wave compounded image with a coherence factor. From FIG. 10A, FIG. 10B, and FIG. 11, it may be seen that sidelobes in the image of FIG. 10B have been suppressed with the coherence factor. Therefore, compared with compounded image of FIG. 10A, the spatial and contrast resolution of the compounded image with the coherence factor of FIG. 10B is increased.

The exemplary embodiments provide an ultrasound apparatus and an ultrasound method for beamforming with a plane wave transmission. This technology uses plane waves for transmission at a transmitter, while cooperates with an imaging technique using K-Space beamforming at a receiver end. According to an exemplary embodiment, the technology may perform the K-Space beamforming further with an angular compounding scheme at the receiver end to enhance image quality such as increasing image resolution, high frame rate imaging, and so on. According to another exemplary embodiment, the technology may perform the K-Space beamforming and the angular compounding further with a coherence factor at the receiver end to enhance image quality such as increasing spatial and contrast resolution, high frame rate imaging, and so on.

It will be apparent to those skilled in the art that various modifications and variation can be made to the disclosed embodiments. It is intended that the specification and examples be considered as exemplary only, with a true scope of the disclosure being indicated by the following claims and their equivalents.

What is claimed is:

1. An ultrasound apparatus for beamforming with a plane wave transmission, comprising:
   a transceiver connected to a transducer array having a plurality of transducer elements, wherein the transceiver transmits at least one substantially planar ultrasonic wave into a target region at one or more angles relative to the transducer array, and receives one or more signals responsive from the transducer array; and at least one processor that applies a fast Fourier transform (FFT) to the one or more signals from each of the plurality of transducer elements and calculates at least one frequency data within a frequency region, and applies an inverse FFT to at least one produced frequency data to obtain a final beamformed image corresponding to the at least one produced frequency data, wherein the frequency data are represented by a first spatial frequency coordinate (kx) and a second spatial frequency coordinate (kz), a ratio of the second spatial frequency coordinate (kz) and the first spatial frequency coordinate (kx) of the produced frequency data within the frequency region is greater than $$\frac{1+\cos\varphi_{max}}{\sin\varphi_{max}},$$

and the ratio is greater than $$(-1)\frac{1+\cos\varphi_{max}}{\sin\varphi_{max}},$$

wherein $\varphi_{max}$ is a maximum acceptance angle of the plurality of transducer elements of the transducer array, $k_x=2\pi/\text{pitch}$, and $k_z=2\pi/dz$, wherein pitch is a distance between two transducer elements of the plurality of transducer elements.

2. The ultrasound apparatus as claimed in claim 1, wherein for each angle of the plurality of different angles, the transceiver transmits a substantially planar ultrasonic wave into the target region at the angle relative to the transducer array, and receives one or more corresponding signals responsive from the transducer array.

3. The ultrasound apparatus as claimed in claim 2, wherein the at least one processor applies the FFT to the one or more corresponding signals from each of the plurality of transducer elements and calculates at least one corresponding frequency data within the frequency region for each of the plurality of different angles, then computes a combined frequency data by using a plurality of produced frequency data and applies the inverse FFT to the combined frequency data.

4. The ultrasound apparatus as claimed in claim 2, wherein the at least one processor applies the FFT to the one or more corresponding signals from each of the plurality of transducer elements, calculates at least one corresponding frequency within the frequency region and applies the inverse FFT to at least one corresponding frequency data for each of the plurality of different angles, thereby obtaining a plurality of corresponding beamformed images, and computes the final beamformed image that is a function of the plurality of corresponding beamformed images and a coherence factor.

5. The ultrasound apparatus as claimed in claim 1, wherein the FFT is a non-uniform FFT.

6. The ultrasound apparatus as claimed in claim 1, wherein the ultrasound apparatus further includes a display to display one or more beamforming images produced by the at least one processor.

7. The ultrasound apparatus as claimed in claim 1, wherein the at least one frequency data is at least one spatial frequency spectrum.

8. The ultrasound apparatus as claimed in claim 1, wherein each of the one or more angles is a steered angle between a traveling direction of the at least one substantially planar ultrasonic wave and a normal line perpendicular to a surface of the transducer array.

9. The ultrasound apparatus as claimed in claim 1, wherein the at least one processor is in a receiver end.

10. An ultrasound method for beamforming with a plane wave transmission, comprising:

transmitting, by a transceiver, at least one substantially planar ultrasonic wave into a target region at one or more angles relative to a transducer array having a plurality of transducer elements, and receiving one or more signals responsive from the transducer array; and performing a beamforming by at least one processor, which further including:

applying a fast Fourier transform (FFT) to the one or more signals from each of the plurality of transducer elements and calculating at least one frequency within a frequency region, and applying an inverse FFT to at least one produced frequency data to obtain a final beamformed image corresponding to the at least one produced frequency data, wherein the frequency data are represented by a first spatial frequency coordinate (kx) and a second spatial frequency coordinate (kz), a ratio of the second spatial frequency coordinate (kz) and the first spatial frequency coordinate (kx) of the produced frequency data within the frequency region is greater than $$\frac{1+\cos\varphi_{max}}{\sin\varphi_{max}},$$

and the ratio is greater than $$(-1)\frac{1+\cos\varphi_{max}}{\sin\varphi_{max}},$$

wherein $\varphi_{max}$ is a maximum acceptance angle of the plurality of transducer elements of the transducer array, $k_x=2\pi/\text{pitch}$, and $k_z=2\pi/dz$, wherein pitch is a distance between two transducer elements of the plurality of transducer elements.

11. The ultrasound method as claimed in claim 10, wherein the FFT is a non-uniform FFT.

12. The ultrasound method as claimed in claim 10, wherein the ultrasound method further includes:

forming a beamformed image of at least one target after the inverse FFT has been applied to the at least one produced frequency data.

13. The ultrasound method as claimed in claim 10, wherein each of the one or more angles is a steered angle between a traveling direction of the at least one substantially planar ultrasonic wave and a normal line perpendicular to a surface of the transducer array.

14. An ultrasound method for beamforming with a plane wave transmission, comprising:

for each angle of a plurality of different angles, transmitting by a transceiver, a substantially planar ultrasonic wave into a target region at the angle relative to a transducer array having a plurality of transducer elements, and receiving one or more corresponding signals responsive from the transducer array; and applying by using at least one processor, a fast Fourier transform (FFT) to the one or more corresponding signals from each of the plurality of transducer elements and calculating at least one corresponding frequency data within a frequency region for each of the plurality of different angles, then computing a combined frequency data by using a plurality of produced frequency data and applying an inverse FFT to the combined frequency data to obtain a final beamformed image corresponding to the at least one produced frequency data, wherein the frequency data are represented by a first spatial frequency coordinate (kx) and a second spatial frequency coordinate (kz), a ratio of the second spatial frequency coordinate (kz) and the first spatial frequency coordinate (kx) of the produced frequency data within the frequency region is greater than $$\frac{1+\cos\varphi_{max}}{\sin\varphi_{max}},$$

and the ratio is greater than $$(-1)\frac{1+\cos\varphi_{max}}{\sin\varphi_{max}},$$

wherein $\varphi_{max}$ is a maximum acceptance angle of the plurality of transducer elements of the transducer array, $k_x=2\pi/\text{pitch}$, and $k_z=2\pi/dz$, wherein pitch is a distance between two transducer elements of the plurality of transducer elements.

15. The ultrasound method as claimed in claim 14, wherein each of the one or more angles is a steered angle between a traveling direction of the substantially planar ultrasonic wave and a normal line perpendicular to a surface of the transducer array.

16. The ultrasound method as claimed in claim 14, wherein the combined frequency data is a combined spatial frequency spectrum and the combined spatial frequency spectrum is a function of a plurality of spatial frequency spectrums for the plurality of different angles.

17. The ultrasound method as claimed in claim 14, wherein the ultrasound method further includes:
forming a multi-plane wave compounded image of at least one target after the inverse FFT has been applied to the combined frequency data.

18. An ultrasound method for beamforming with a plane wave transmission, comprising:
for each angle of a plurality of different angles, transmitting by a transceiver, a substantially planar ultrasonic wave into a target region at the angle relative to a transducer array having a plurality of transducer elements, and receiving one or more corresponding signals responsive from the transducer array; and applying by using at least one processor, a fast Fourier transform (FFT) to the one or more corresponding signals from each of the plurality of transducer elements, calculating frequency data within a frequency region and applying an inverse FFT to each of a plurality of frequency data for each of the plurality of different angles, thereby obtaining a plurality of corresponding beamformed images, and computing a final beamformed image that is a function of the plurality of corresponding beamformed images and a coherence factor, wherein the frequency data are represented by a first spatial frequency coordinate (kx) and a second spatial frequency coordinate (kz), a ratio of the second spatial frequency coordinate (kz) and the first spatial frequency coordinate (kx) of the produced frequency data within the frequency region is greater than $$\frac{1+\cos\varphi_{max}}{\sin\varphi_{max}},$$

and the ratio is greater than $$(-1)\frac{1+\cos\varphi_{max}}{\sin\varphi_{max}},$$

wherein $\varphi_{max}$ is a maximum acceptance angle of the plurality of transducer elements of the transducer array, $k_x=2\pi/\text{pitch}$, and $k_z=2\pi/dz$, wherein pitch is a distance between two transducer elements of the plurality of transducer elements.

19. The ultrasound method as claimed in claim 18, wherein each of the one or more angles is a steered angle between a traveling direction of the substantially planar ultrasonic wave and a normal line perpendicular to a surface of the transducer array.

20. The ultrasound method as claimed in claim 18, wherein the coherence factor is determined by a number of images used in an angular compounding and the plurality of corresponding beamformed images.

21. The ultrasound apparatus as claimed in claim 1, where the frequency region in a $k_x$-$k_z$ coordinate system is defined by boundaries described by equations:

$$k=k_{max}=2\pi/\lambda_{max};$$

$$k=k_{min}=2\pi/\lambda_{min};$$

$$k_z = \frac{1+\cos\varphi_{max}}{\sin\varphi_{max}} \text{ and}$$

$$k_z = (-1)\frac{1+\cos\varphi_{max}}{\sin\varphi_{max}};$$

wherein $\lambda_{max}$ and $\lambda_{min}$ are corresponding maximum and minimum wavelengths of an ultrasound wave.

22. The ultrasound method as claimed in claim 10, where the frequency region in a $k_x$-$k_z$ coordinate system is defined by boundaries described by equations:

$$k=k_{max}=2\pi/\lambda_{max};$$

$$k=k_{min}=2\pi/\lambda_{min};$$

$$k_z = \frac{1+\cos\varphi_{max}}{\sin\varphi_{max}} \text{ and}$$

$$k_z = (-1)\frac{1+\cos\varphi_{max}}{\sin\varphi_{max}};$$

wherein $\lambda_{max}$ and $\lambda_{min}$ are corresponding maximum and minimum wavelengths of an ultrasound wave.

23. The ultrasound method as claimed in claim 14, where the frequency region in a $k_x$-$k_z$ coordinate system is defined by boundaries described by equations:

$$k=k_{max}=2\pi/\lambda_{max};$$

$$k=k_{min}=2\pi/\lambda_{min};$$

$$k_z = \frac{1+\cos\varphi_{max}}{\sin\varphi_{max}} \text{ and}$$

$$k_z = (-1)\frac{1+\cos\varphi_{max}}{\sin\varphi_{max}};$$

wherein $\lambda_{max}$ and $\lambda_{min}$ are corresponding maximum and minimum wavelengths of an ultrasound wave.

24. The ultrasound method as claimed in claim 18, where the frequency region in a $k_x$-$k_z$ coordinate system is defined by boundaries described by equations:

$$k=k_{max}=2\pi/\lambda_{max};$$

$$k=k_{min}=2\pi/\lambda_{min};$$

$$k_z = \frac{1+\cos\varphi_{max}}{\sin\varphi_{max}} \text{ and}$$

$$k_z = (-1)\frac{1+\cos\varphi_{max}}{\sin\varphi_{max}};$$

wherein $\lambda_{max}$ and $\lambda_{min}$ are corresponding maximum and minimum wavelengths of an ultrasound wave.

* * * * *